Figure 1:
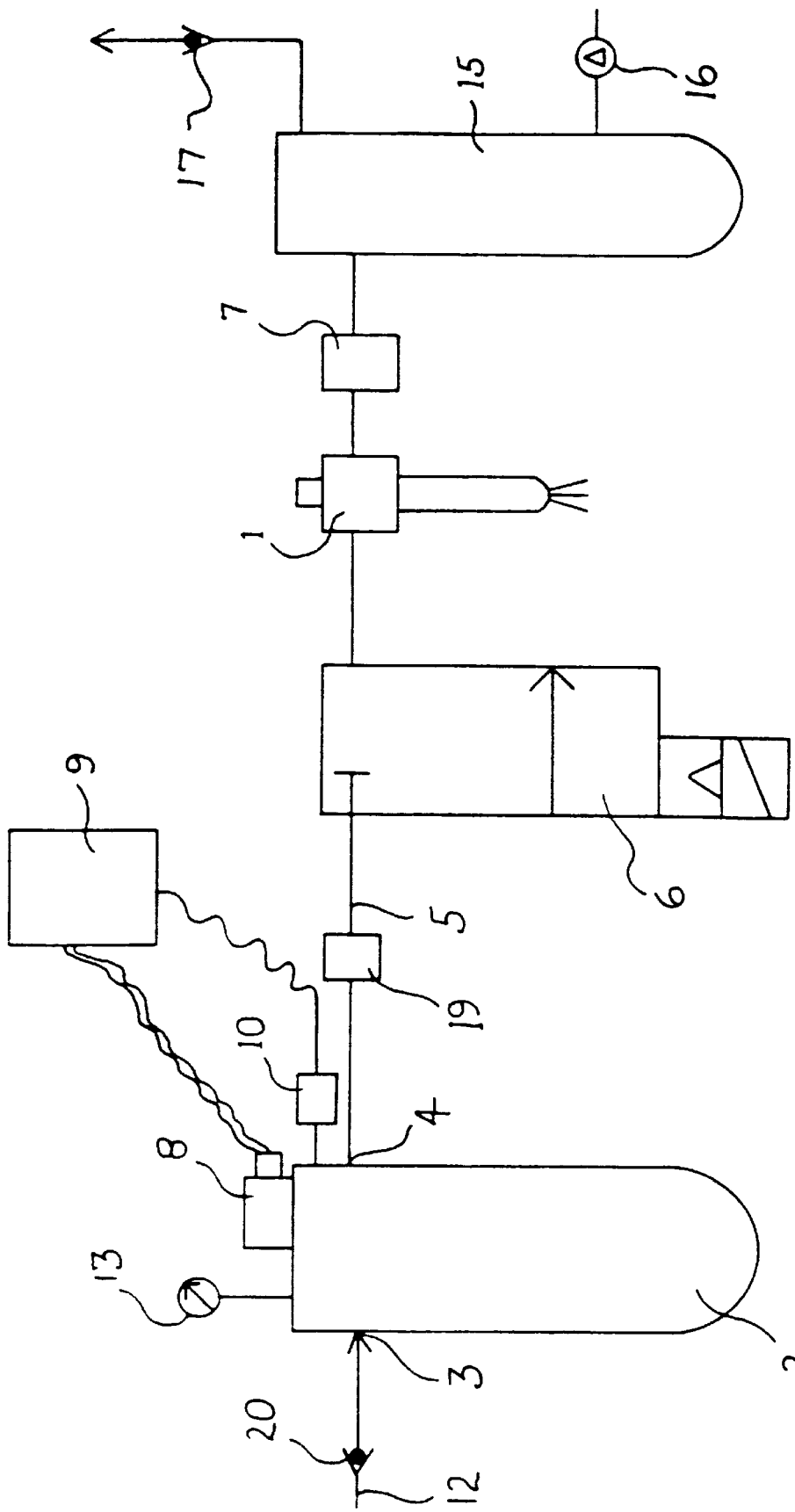

United States Patent [19]
Flood

[11] Patent Number: 5,902,527
[45] Date of Patent: May 11, 1999

[54] BLOW MOULDING METHOD AND APPARATUS

[75] Inventor: Nicholas Gerard Flood, County Westmeath, Ireland

[73] Assignee: Menza Limited, County Westmeth, Ireland

[21] Appl. No.: 08/776,569

[22] PCT Filed: May 30, 1996

[86] PCT No.: PCT/IE96/00033

§ 371 Date: Feb. 3, 1997

§ 102(e) Date: Feb. 3, 1997

[87] PCT Pub. No.: WO97/00164

PCT Pub. Date: Jan. 3, 1997

[30] Foreign Application Priority Data

Jun. 19, 1995 [IE] Ireland ..................................... 950447

[51] Int. Cl.[6] .................................................. B29C 49/78
[52] U.S. Cl. ........................................ 264/40.3; 425/136
[58] Field of Search .................................. 264/40.3, 40.1; 425/135, 136

[56] References Cited

U.S. PATENT DOCUMENTS

| | | | |
|---|---|---|---|
| 3,841,555 | 10/1974 | Lilja | 239/8 |
| 4,120,924 | 10/1978 | Rainville | 264/40.3 |
| 4,946,366 | 8/1990 | Dundas et al. | 425/536 |
| 5,007,817 | 4/1991 | Wallis | 425/136 |

FOREIGN PATENT DOCUMENTS

| | | |
|---|---|---|
| 1174052 | 7/1964 | Germany. |
| 3827043 | 12/1990 | Germany. |
| S66135 | 12/1995 | Ireland. |

OTHER PUBLICATIONS

Kunststoffberater, vol. 30, No. 4, Apr. 1985, Germany, R. Hegele, "Blasluftsteuerung und Nachkuhlung . . . ".

D.V. Rosato, "Blow Molding Handbook", 1989, Hanser, pp. 412–415, Figures 11.8 and 11.10.

*Primary Examiner*—Catherine Timm
*Attorney, Agent, or Firm*—Jacobson, Price, Holman & Stern, PLLC

[57] ABSTRACT

A blow moulding apparatus includes a blowpin 1 and a dedicated air control system for optimizing the blow moulding operation. The air control system comprises an air supply vessel 2 for holding typically 10 liters of air at a pressure of at least 8 bar. Pressurized air is delivered through a control valve 6 to the blowpin 1. A pressure sensing valve 8 senses the air pressure in the vessel 2 and if the pressure falls below a preset value a signal is outputted to a controller 9 which disables operation of the blow moulding station. The temperature of the air is also controlled to be about 8° C. by a temperature sensor 10 which also provides a signal to the controller 9. Air may be exhausted into an exhaust vessel 15 maintained at a negative pressure before exhaust to atmosphere. Cycle time is reduced and product quality is improved.

16 Claims, 1 Drawing Sheet

BLOW MOULDING METHOD AND APPARATUS

The invention relates to an apparatus and method for blow moulding.

Extrusion blow moulding is a technique that is used for moulding hollow plastics articles such as plastics cases and the like. A thermally plasticised thermoplastic tubular parison is first extruded. A two part moulding die is then closed around the parison. Air is injected into the parison enclosed by the die to blow mould the parison into the shape of the cavity of the die. The mould is then opened and the blow moulded article is removed.

There are several problems in blow moulding to a high standard of quality in a cost efficient manner. One of the problems is to minimize the cycle time to produce a moulded article.

This invention is directed towards providing an improved apparatus and method for blow moulding to a high quality standard while minimizing cycle time.

According to the invention there is provided a blow moulding apparatus comprising:

a blow moulding station having a blowpin through which pressurized air is blown during blow moulding; and an air control system dedicated to the blow moulding station;

the air control system comprising:
  a vessel for holding air at a pressure of at least 8 bar;
  the vessel having an inlet for air supply and an outlet through which pressurized air is delivered;
  a delivery line from the vessel outlet to the blowpin of the dedicated blow moulding station;
  a control valve on the delivery line for delivery of air on demand from the vessel to the blowpin;
  an exhaust unit for exhaust of air from the delivery line;
  a pressure sensing means for sensing the pressure of air in the vessel; and
  pressure control means for preventing operation of the dedicated blow moulding station if the pressure in the vessel is below a preset pressure.

In one embodiment of the invention the volume of the vessel for holding air is at least 10 liters. The volume may be typically 10 or 25 liters.

Preferably the preset pressure in the vessel is approximately 10 bar. In a particularly preferred embodiment of the invention the air control system includes temperature sensing means for sensing the temperature of air for delivery to the blowpin and temperature control means for preventing operation of the dedicated blow moulding station if the temperature of the air is not within a preset temperature range. In this case preferably the temperature sensing means is located to sense the temperature of the air in the air supply vessel.

Preferably the preset temperature range is from 8° C. to 10° C., especially approximately 8° C.

In another preferred embodiment of the invention the air control system includes water level sensing means for sensing the level of condensate in the supply vessel and a drain system for removing condensate from the supply vessel.

Preferably the control valve on the delivery line for delivery of air to the blowpin is a fast acting directional control valve having ports for maximum flow of air to the blowpin with minimum pressure drop across the control valve.

In a preferred arrangement the inlet to the air supply vessel is supplied with air at a pressure of at least 8 bar through an inlet pipe having a diameter of at least 15 mm preferably at least 25 mm.

In one embodiment of the invention the apparatus includes an exhaust vessel maintained at a negative pressure into which exhaust air is delivered before exhausting to atmosphere. Preferably the exhaust vessel is maintained at a negative pressure of from 0.2 to 0.8 bar by a vacuum pump. Usually the air is exhausted from the exhaust vessel through a non-return valve. Preferably the exhaust vessel has a capacity larger than that of the air exhausted in the blow moulding cycle.

The invention also provides a method of blow moulding including the steps of:

delivering pressurized air to a supply vessel dedicated to a blow moulding station, the supply vessel having an air inlet and an air outlet;

delivering air from the supply vessel outlet through a delivery line to a blowpin of a blow moulding station;

delivering the air through a control valve on the delivery line;

sensing the pressure of air in the supply vessel; and preventing operation of the dedicated blow moulding station if the pressure in the supply vessel is below a preset pressure.

Preferably the method includes the steps of:

sensing the temperature of air for delivery to the blowpin; and preventing operation of the dedicated blow moulding station if the temperature of the air is not within a preset range.

In a preferred embodiment of the invention the method includes the step of exhausting air from the blowpin into an exhaust vessel maintained at a negative pressure prior to exhaust to atmosphere.

The invention also provides a blow moulded article whenever produced using the apparatus and/or method of the invention.

The invention will be more clearly understood from the following description thereof given by way of example only with reference to the accompanying drawings, in which:

FIG. 1 is a schematic view of part of a blow moulding apparatus according to the invention.

Referring to FIG. 1 there is illustrated portion of a blow moulding apparatus according to the invention which comprises a blow moulding station including a blowpin 1 through which pressurized air is blown during blow moulding. An air control system dedicated to the blow moulding station comprises an air supply vessel 2 for holding typically 10 or 25 liters of air at a pressure of at least 8 bar. The vessel 2 has an inlet 3 for air supply and an outlet 4 through which pressurized air is delivered along a delivery line 5 to the blowpin 1. A large port, quick acting, large flow rate, directional control valve 6 on the delivery line 5 delivers pressurized air on demand to the blowpin 1. Air is exhausted through a quick exhaust unit 7. Air may be exhausted initially to an exhaust vessel 15 maintained at negative pressure of typically 0.2 to 0.8 bar by a vacuum pump 16 and into which exhaust air is delivered before exhausting to atmosphere through a non-return valve 17. The exhaust vessel 15 has a capacity larger than that of the air exhausted in a typical blow moulding cycle. For example, the exhaust vessel 15 may have a capacity of 10 to 50 liters. Because the air exhausts initially to a negative pressure vessel 15 it exhausts more quickly than in conventional systems in which air is exhausted directly to atmosphere. In addition, because air is exhausted into a vessel which is under vacuum there is a vast reduction in the noise developed when the air exhausts over convention air exhaust systems.

The control system also includes an air pressure sensing means provided by a senstronic pressure sensing valve 8 which provides an electronic signal along a control line to a machine programmable logic controller 9. In the event of the air pressure falling below a preset value, typically 10 to 15 bar, ideally about 10 bar, the controller 9 outputs an alarm signal and also a signal to disable operation of the blow moulding station. A proportional pneumatic value 19 may also be provided on the supply line 5 to maintain a high flow rate of air.

A temperature sensor 10 is located to sense the temperature of the air in the air vessel 2 and if the temperature falls outside a preset range of typically 8 to 12° C., preferably 8° C.±1° C., it provides a signal to the controller 9 which outputs an alarm signal and provides an output to disable operation of the blow moulding station.

Although not illustrated the control system may also include a moisture sensing means, typically provided by a water level sensing device humidity probe, for sensing the level of condensate, and moisture control means provided by an automatic drain system which removes condensate from the supply vessel 2.

To minimize pressure drop an air line supply 12 to the vessel inlet 3 is through a relatively large diameter pipe, preferably at least 15 mm, ideally at least 25 mm. Air is supplied at a minimum of 8 bar and preferably at 10 bar. A pressure gauge 13 is also provided on the vessel 2. A non return valve 20 is provided on the supply line 12.

In use, each blow moulding station is provided with a dedicated air control system as described above.

Pressurized air is delivered into the vessel 2 and the pressure and temperature of the air is closely controlled to lie within preset limits. If any of the parameters fall outside the preset limits an alarm is given and the controller 9 disables the further operation of the moulding station. During normal operation air is supplied through the control valve 6 to the blowpin 1 at optimum operating condition. In this way the air which is delivered into a parison to blow the parison against a die cavity to form an article is consistently delivered at high pressure and at minimum temperature and humidity. Adverse effects on the blow moulding process and blow moulded articles are thereby avoided. Dimensional changes and surface finish variations in the product are avoided while minimizing cycle time. This is because the inflation of the parison is faster and improved contact between the plastic and the surfaces of the die cavity are achieved.

EXAMPLE

A two litre polyethylene container was blow moulded on a continuous extrusion blow moulding machine using conventional pressurized air supply direct from a ring main. This resulted in a production rate of 156 containers per hour to an acceptable quality finish.

An air control system as described above was installed on the blow moulding machine as follows:

volume of air supply vessel: 25 liters;
set pressure range: 10 bar±0.5 bar;
set temperature range: 8° C. to 12° C.

The equipment was set up and operated as described above and resulted in a significant increase in production with associated improvements in quality of the polyethylene containers.

In a range of tests as different blow moulding machines an increase in production of from 5% to 15%, average 10%, was noted.

Many variations on the specific embodiments of the invention described will be readily apparent and accordingly the invention is not limited to the embodiments hereinbefore described which may be varied in detail.

I claim:

1. A blow moulding apparatus comprising:
    a blow mould station having a blowpin through which pressurized air is blown during blow moulding;
    an air control system dedicated to the blow moulding station;
    the air control system comprising:
        a supply vessel for holding air at a pressure of at least 8 bar;
        the supply vessel having an inlet for air supply and an outlet through which pressurized air is delivered;
        a delivery line from the supply vessel outlet to the blowpin of the dedicated blow moulding station;
        a control valve on the delivery line for delivery of air on demand from the supply vessel to the blowpin;
        an exhaust unit on the delivery line for exhaust of air from the delivery line;
        a pressure sensing means for sensing the pressure of air in the supply vessel; and
        pressure control means for preventing operation of the dedicated blow moulding station if the pressure in the supply vessel is below a preset pressure; and
        an exhaust vessel in communication with the exhaust unit and the exhaust vessel being maintained at a negative pressure into which exhaust air is delivered by the exhaust unit before exhausting to atmosphere.

2. A blow moulding apparatus as claimed in claim 1 wherein the volume of the supply vessel for holding air is at least 10 liters.

3. A blow moulding apparatus as claimed in claim 1 wherein the volume of the supply vessel for holding air is approximately 25 liters.

4. A blow moulding apparatus as claimed in claim 1 wherein the preset pressure in the supply vessel is approximately 10 bar.

5. A blow moulding apparatus as claimed in claim 1 wherein the air control system includes temperature sensing means for sensing the temperature of air for delivery to the blowpin and temperature control means for preventing operation of the dedicated blow moulding station if the temperature of the air is not within a preset temperature range.

6. A blow moulding apparatus as claimed in claim 5 wherein the temperature sensing means is located to sense the temperature of the air in the air vessel.

7. A blow moulding apparatus as claimed in claim 5 wherein the preset temperature range is from 8° C. to 12° C.

8. A blow moulding apparatus as claimed in claim 5 wherein the preset temperature is approximately 8° C.

9. A blow moulding apparatus as claimed in claim 1 wherein the air control system includes water level sensing means for sensing the level of condensate in the supply vessel and a drain system for removing condensate from the vessel.

10. A blow moulding apparatus as claimed in claim 1 wherein the control valve on the delivery line for delivery of air to the blowpin is a fast acting directional control valve having ports for maximum flow of air to the blowpin with minimum pressure drop across the control valve.

11. A blow moulding apparatus as claimed in claim 1 wherein the inlet to the air supply vessel is supplied with air at a pressure of at least 8 bar through an inlet pipe having a diameter of at least 15 mm.

12. A blow moulding apparatus as claimed in claim 11 wherein the air inlet pipe has a diameter of at least 25 mm.

13. A blow moulding apparatus as claimed in claim 1 wherein the exhaust vessel is maintained at a negative pressure of from 0.2 to 0.8 bar by a vacuum pump.

14. A blow moulding apparatus as claimed in claim 1 wherein the air is exhausted from the exhaust vessel through a non-return valve.

15. A method of blow moulding using the apparatus of claim 1 including the steps of:

delivering pressurized air to a supply vessel dedicated to a blow moulding station, the supply vessel having an air inlet and an air outlet;

delivering air from the supply vessel outlet through a delivery line to a blowpin of a blow moulding station;

delivering the air through a control valve on the delivery line;

sensing the pressure of air in the supply vessel;

preventing operation of the dedicated blow moulding station if the pressure in the supply vessel is below a preset pressure; and exhausting air from the blowpin into an exhaust vessel maintained at a negative pressure prior to exhaust to atmosphere.

16. A method as claimed in claim 15 including the steps of:

sensing the temperature of air for delivery to the blowpin; and preventing operation of the dedicated blow moulding station if the temperature of the air is not within a preset range.

* * * * *